United States Patent
Du et al.

(10) Patent No.: US 9,819,177 B2
(45) Date of Patent: Nov. 14, 2017

(54) PROTECTIVE DEVICE WITH NON-VOLATILE MEMORY MISWIRE CIRCUIT

(71) Applicant: Pass and Seymour, Inc., Syracuse, NY (US)

(72) Inventors: Hai Hu Du, Dongguan (CN); Joshua P Haines, Marcellus, NY (US); Michael F. McMahon, East Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 407 days.

(21) Appl. No.: 13/834,636

(22) Filed: Mar. 15, 2013

(65) Prior Publication Data

US 2014/0268436 A1    Sep. 18, 2014

(51) Int. Cl.
*H02H 3/00* (2006.01)
*H02H 11/00* (2006.01)

(52) U.S. Cl.
CPC ................................. *H02H 11/002* (2013.01)

(58) Field of Classification Search
CPC .................................................... H02H 11/002
USPC ......................................................... 361/42
See application file for complete search history.

(56) References Cited

U.S. PATENT DOCUMENTS

| | | |
|---|---|---|
| 3,810,003 A * | 5/1974 | Portoulas ...................... 324/508 |
| 3,872,354 A | 3/1975 | Nestor |
| 3,953,766 A | 4/1976 | Howell et al. |
| 4,309,681 A | 1/1982 | Draper |
| 4,345,289 A | 8/1982 | Howell |
| 4,359,626 A | 11/1982 | Potter |
| 4,412,193 A | 10/1983 | Bienwald et al. |
| 4,477,857 A | 10/1984 | Crocker |
| 4,574,324 A | 3/1986 | Packard |
| 4,598,331 A | 7/1986 | Legatti |
| 4,618,907 A | 10/1986 | Leopold |
| 4,931,761 A | 6/1990 | Kijima |
| 4,979,070 A | 12/1990 | Bodkin |
| 5,177,657 A | 1/1993 | Baer |
| 5,202,662 A | 4/1993 | Bienwald |
| 5,363,083 A | 11/1994 | Fischer |
| 5,363,269 A | 11/1994 | McDonald |
| 5,418,678 A | 5/1995 | McDonald |
| 5,477,412 A | 12/1995 | Neiger |

(Continued)

FOREIGN PATENT DOCUMENTS

| | | |
|---|---|---|
| WO | 2007027908 A3 | 3/2007 |
| WO | 2007056668 | 5/2007 |

(Continued)

*Primary Examiner* — Stephen W Jackson
(74) *Attorney, Agent, or Firm* — Bond Schoeneck & King, PLLC; Frederick Price; George McGuire

(57) ABSTRACT

The present invention is directed to an electrical wiring device that includes a processing circuit is configured to determine the wiring state based on detecting a wiring state parameter at the plurality of line terminals during a predetermined period after the tripped state has been established. The processing circuit is configured to store a wiring state indicator in a wiring state register based on a wiring state determination. The wiring state register being preset to trip the circuit interrupter when the AC power source is applied by an installer to the plurality of line terminals or the plurality of load terminals for the first time.

53 Claims, 8 Drawing Sheets

(56) References Cited

U.S. PATENT DOCUMENTS

| | | |
|---|---|---|
| 5,541,800 A | 7/1996 | Misencik |
| 5,594,398 A | 1/1997 | Marcou |
| 5,600,524 A | 2/1997 | Neiger et al. |
| 5,638,243 A | 6/1997 | Torezan |
| 5,661,623 A | 8/1997 | McDonald |
| 5,706,155 A | 1/1998 | Neiger |
| 5,715,125 A | 2/1998 | Neiger et al. |
| 5,729,417 A | 3/1998 | Neiger et al. |
| 5,923,239 A | 7/1999 | Krueger |
| 5,963,408 A | 10/1999 | Neiger et al. |
| 6,040,967 A | 3/2000 | DiSalvo |
| 6,043,966 A | 3/2000 | Krueger |
| 6,052,265 A | 4/2000 | Zaretsky et al. |
| 6,111,733 A | 8/2000 | Neiger et al. |
| 6,226,161 B1 | 5/2001 | Neiger et al. |
| 6,246,558 B1 | 6/2001 | DiSalvo et al. |
| 6,262,871 B1 | 7/2001 | Nemir et al. |
| 6,317,307 B1 | 11/2001 | Bone |
| 6,370,001 B1 | 4/2002 | Macbeth |
| 6,381,112 B1 | 4/2002 | DiSalvo et al. |
| 6,407,893 B1 | 6/2002 | Neiger |
| 6,433,977 B1 | 8/2002 | Macbeth |
| 6,437,953 B2 | 8/2002 | DiSalvo |
| 6,442,007 B1 | 8/2002 | Li |
| 6,492,894 B2 | 12/2002 | Bone |
| 6,522,510 B1 | 2/2003 | Finlay et al. |
| 6,587,319 B1 | 7/2003 | Finlay, Sr. |
| 6,590,753 B1 | 7/2003 | Finlay |
| 6,621,388 B1 | 9/2003 | Macbeth |
| 6,628,486 B1 | 9/2003 | Macbeth |
| 6,670,870 B2 | 12/2003 | Macbeth |
| 6,674,289 B2 | 1/2004 | Macbeth |
| 6,721,156 B2 | 4/2004 | Masghati |
| 6,724,590 B1 | 4/2004 | Radosavljevic |
| 6,734,769 B1 | 5/2004 | Germain |
| 6,788,508 B2 | 9/2004 | Papallo, Jr. |
| 6,807,035 B1 | 10/2004 | Baldwin et al. |
| 6,807,036 B2 | 10/2004 | Baldwin |
| 6,831,819 B2 | 12/2004 | Nemir et al. |
| 6,842,095 B2 | 1/2005 | Macbeth |
| 6,850,394 B2 | 2/2005 | Kim |
| 6,856,498 B1 | 2/2005 | Finlay, Sr. |
| 6,867,954 B2 | 3/2005 | Wu et al. |
| 6,873,158 B2 | 3/2005 | Macbeth |
| 6,900,972 B1 | 5/2005 | Chan |
| 6,937,452 B2 | 8/2005 | Chan |
| 6,952,150 B2 | 10/2005 | Radsavljevic et al. |
| 6,958,895 B1 | 10/2005 | Radosavljevic et al. |
| 6,980,005 B2 | 12/2005 | Finlay, Sr. et al. |
| 7,009,473 B2 | 3/2006 | Zhang |
| 7,068,481 B2 | 6/2006 | Radosavljevic et al. |
| 7,082,021 B2 | 7/2006 | Chan et al. |
| 7,084,725 B2 | 8/2006 | Richter |
| 7,088,205 B2 | 8/2006 | Germain |
| 7,088,206 B2 | 8/2006 | Germain |
| 7,098,761 B2 | 8/2006 | Germain |
| 7,099,129 B2 | 8/2006 | Neiger |
| 7,116,191 B2 | 10/2006 | Wang |
| 7,133,266 B1 | 11/2006 | Finlay |
| 7,149,065 B2 | 12/2006 | Baldwin et al. |
| 7,154,715 B2 | 12/2006 | Yamanaka et al. |
| 7,154,718 B1 | 12/2006 | Finlay, Sr. |
| 7,161,780 B2 | 1/2007 | Germain |
| 7,164,563 B2 | 1/2007 | Chan |
| 7,164,564 B1 | 1/2007 | Finlay, Sr. et al. |
| 7,167,066 B2 | 1/2007 | Wang |
| 7,173,799 B1 | 2/2007 | Weeks et al. |
| 7,184,250 B2 | 2/2007 | Bonilla |
| 7,187,526 B2 | 3/2007 | DiSalvo |
| 7,195,500 B2 | 3/2007 | Huang et al. |
| 7,196,886 B2 | 3/2007 | Chan |
| 7,209,330 B2 | 4/2007 | DiSalvo |
| 7,212,386 B1 | 5/2007 | Finlay, Sr. et al. |
| 7,227,435 B2 | 6/2007 | Germain |
| 7,239,491 B1 | 7/2007 | Morgan et al. |
| 7,253,629 B1* | 8/2007 | Richards et al. ............ 324/424 |
| 7,256,973 B1 | 8/2007 | Radosavljevic |
| 7,265,956 B2 | 9/2007 | Huang |
| 7,268,559 B1 | 9/2007 | Cheng et al. |
| 7,283,340 B1 | 10/2007 | Finlay, Sr. et al. |
| 7,289,306 B2 | 10/2007 | Huang |
| 7,292,419 B1 | 11/2007 | Nemir |
| 7,295,410 B1 | 11/2007 | Packard et al. |
| 7,295,415 B2 | 11/2007 | Huang et al. |
| 7,298,598 B1 | 11/2007 | Morgan et al. |
| 7,307,821 B2 | 12/2007 | Wang |
| 7,312,963 B1 | 12/2007 | Radosavljevic |
| 7,315,227 B2 | 1/2008 | Huang et al. |
| 7,315,437 B2 | 1/2008 | Bonilla et al. |
| 7,317,600 B2 | 1/2008 | Huang et al. |
| 7,336,457 B2 | 2/2008 | Liscinsky |
| 7,336,458 B2 | 2/2008 | Ziegler |
| 7,355,497 B2 | 4/2008 | Germain |
| 7,355,827 B2 | 4/2008 | Wang |
| 7,365,621 B2 | 4/2008 | Germain |
| 7,372,678 B2 | 5/2008 | DiSalvo et al. |
| 7,375,938 B1 | 5/2008 | Radosavljevic |
| 7,400,477 B2 | 7/2008 | Campolo |
| 7,400,479 B2 | 7/2008 | DiSalvo |
| 7,403,086 B2 | 7/2008 | Wu |
| 7,408,432 B2 | 8/2008 | Shi |
| 7,411,766 B1 | 8/2008 | Huang et al. |
| 7,414,499 B2 | 8/2008 | Germain |
| 7,414,818 B2 | 8/2008 | Shi |
| 7,439,832 B1 | 10/2008 | Radosavljevic et al. |
| 7,439,833 B2 | 10/2008 | Germain |
| 7,443,309 B2 | 10/2008 | Baldwin et al. |
| 7,463,124 B2 | 12/2008 | DiSalvo |
| 7,492,558 B2 | 2/2009 | Germain |
| 7,492,559 B2 | 2/2009 | Zhang et al. |
| 7,498,909 B2 | 3/2009 | Zhang |
| 7,498,910 B2 | 3/2009 | Gallas |
| 7,515,024 B2 | 4/2009 | Chen |
| 7,518,840 B2 | 4/2009 | Elms |
| 7,522,064 B2 | 4/2009 | Zhang et al. |
| 7,525,402 B2 | 4/2009 | Gao |
| 7,525,441 B2 | 4/2009 | Zhang et al. |
| 7,535,371 B2 | 5/2009 | Wang |
| 7,538,647 B2 | 5/2009 | Leopold |
| 7,538,993 B2 | 5/2009 | Huang et al. |
| 7,538,994 B2 | 5/2009 | Bonilla |
| 7,542,252 B2 | 6/2009 | Chan |
| 7,545,244 B2 | 6/2009 | DiSalvo |
| 7,573,692 B1 | 8/2009 | Weeks et al. |
| 7,576,959 B2 | 8/2009 | Huang et al. |
| 7,576,960 B2 | 8/2009 | Gao et al. |
| 7,586,718 B1 | 9/2009 | Radosavljevic et al. |
| 7,592,924 B2 | 9/2009 | Zhang et al. |
| 7,598,828 B1 | 10/2009 | Weeks et al. |
| 7,619,860 B1 | 11/2009 | Finlay, Sr. et al. |
| 7,626,788 B2 | 12/2009 | Wang et al. |
| 7,642,457 B2 | 1/2010 | Weeks et al. |
| 7,643,257 B1 | 1/2010 | Morgan et al. |
| 7,719,804 B1 | 5/2010 | Morgan et al. |
| 7,733,617 B2 | 6/2010 | Baldwin et al. |
| 7,737,809 B2 | 6/2010 | Germain et al. |
| 7,751,162 B1 | 7/2010 | Packard et al. |
| 7,791,848 B2 | 9/2010 | Baldwin et al. |
| 7,791,850 B2 | 9/2010 | Chen |
| 7,800,873 B2 | 9/2010 | Batko et al. |
| 7,800,874 B2 | 9/2010 | DiSalvo et al. |
| 7,852,606 B2 | 12/2010 | Mernyk et al. |
| 7,859,368 B2 | 12/2010 | Huang et al. |
| 7,885,045 B1 | 2/2011 | Morgan et al. |
| 7,911,746 B2 | 3/2011 | Zaretsky et al. |
| 8,054,590 B2 | 11/2011 | Li et al. |
| 8,081,001 B2 | 12/2011 | Hooper et al. |
| 8,125,228 B2 | 2/2012 | Richards et al. |
| 8,295,017 B2 | 10/2012 | Finlay et al. |
| 8,514,529 B1 | 8/2013 | McMahon et al. |
| 8,526,146 B2 | 9/2013 | Finlay et al. |
| 8,541,978 B2* | 9/2013 | Fukuo ............... B60L 3/0069<br>320/109 |
| 2004/0223272 A1 | 11/2004 | Germain |

(56) References Cited

U.S. PATENT DOCUMENTS

| | | |
|---|---|---|
| 2005/0063109 A1 | 3/2005 | Baldwin |
| 2006/0139132 A1 | 6/2006 | Porter |
| 2006/0181373 A1 | 8/2006 | Germain |
| 2006/0198071 A1* | 9/2006 | Campolo et al. ............... 361/72 |
| 2006/0268472 A1 | 11/2006 | Winch |
| 2006/0279886 A1 | 12/2006 | Huang |
| 2006/0285262 A1 | 12/2006 | Neiger |
| 2007/0014058 A1 | 1/2007 | Chan |
| 2007/0030608 A1 | 2/2007 | Baldwin |
| 2007/0035898 A1 | 2/2007 | Baldwin |
| 2007/0053118 A1 | 3/2007 | Germain |
| 2007/0133136 A1 | 6/2007 | Germain |
| 2007/0188955 A1 | 8/2007 | Elms |
| 2007/0215576 A1 | 9/2007 | Chung |
| 2007/0230072 A1 | 10/2007 | Zhang |
| 2007/0268635 A1 | 11/2007 | Bonasia |
| 2007/0274012 A1 | 11/2007 | Bonasia |
| 2008/0007879 A1 | 1/2008 | Zaretsky et al. |
| 2008/0013227 A1 | 1/2008 | Mernyk et al. |
| 2008/0022153 A1 | 1/2008 | Wang |
| 2008/0024252 A1 | 1/2008 | Gallas |
| 2008/0024945 A1 | 1/2008 | Gao |
| 2008/0088992 A1 | 4/2008 | Williamson |
| 2008/0094765 A1 | 4/2008 | Huang et al. |
| 2008/0112099 A1 | 5/2008 | Li |
| 2008/0123227 A1 | 5/2008 | Bonasia |
| 2008/0170341 A1 | 7/2008 | Huang |
| 2008/0186642 A1 | 8/2008 | Campolo |
| 2008/0225448 A1 | 9/2008 | Li |
| 2008/0272925 A1 | 11/2008 | Griffin |
| 2009/0040667 A1 | 2/2009 | DiSalvo et al. |
| 2009/0052098 A1 | 2/2009 | DiSalvo |
| 2009/0086389 A1 | 4/2009 | Huang et al. |
| 2009/0086390 A1 | 4/2009 | Huang |
| 2009/0091869 A1 | 4/2009 | Huang |
| 2009/0128264 A1 | 5/2009 | DiSalvo |
| 2009/0147416 A1 | 6/2009 | Zheng |
| 2009/0147418 A1 | 6/2009 | Li et al. |
| 2009/0161271 A1 | 6/2009 | Huang et al. |
| 2009/0180222 A1 | 7/2009 | Chen et al. |
| 2009/0251148 A1 | 10/2009 | Finlay, Sr. et al. |
| 2009/0262472 A1 | 10/2009 | Weeks et al. |
| 2010/0013491 A1 | 1/2010 | Hooper et al. |
| 2010/0053826 A1 | 3/2010 | Finlay, Sr. et al. |
| 2010/0073178 A1 | 3/2010 | Huang et al. |
| 2010/0134306 A1 | 6/2010 | Zeng et al. |
| 2010/0238597 A1 | 9/2010 | Baldwin et al. |
| 2010/0295568 A1 | 11/2010 | Ostrovsky et al. |
| 2011/0115511 A1* | 5/2011 | Finlay et al. ............... 324/750.3 |
| 2012/0257314 A1 | 10/2012 | Armstrong |
| 2013/0188290 A1* | 7/2013 | Tomimbang ......... H02H 11/002 361/115 |

FOREIGN PATENT DOCUMENTS

| | | |
|---|---|---|
| WO | 2007093885 | 8/2007 |
| WO | 2007137180 | 11/2007 |
| WO | 2007143576 | 12/2007 |
| WO | 2008005928 | 10/2008 |

* cited by examiner

PROTECTIVE DEVICE WITH NON-VOLATILE MEMORY MISWIRE CIRCUIT

BACKGROUND OF THE INVENTION

1. Field of the Invention

The present invention relates generally to protective devices, and particularly to protective devices with miswire protection.

2. Technical Background

AC power is provided to a house, building or other such facilities by coupling one or more breaker panels to an electrical distribution system, or another such source of AC power. The breaker panel distributes AC power to one or more branch electric circuits installed in the structure. The electric circuits typically include one or more receptacle outlets and may further transmit AC power to one or more electrically powered devices, commonly referred to in the art as load circuits. The receptacle outlets provide power to user-accessible loads that include a power cord and plug, with the plug being insertable into the receptacle outlet. Because certain types of faults have been known to occur in electrical wiring systems, each electric circuit typically employs one or more electric circuit protection devices. Electric circuit protective devices have been disposed within the breaker panel, receptacle outlets, plugs and the like.

Both receptacle wiring devices and electric circuit protective wiring devices in general, are disposed in an electrically non-conductive housing. The housing includes electrical terminals that are electrically insulated from each other. The line terminals are intended to be connected by the installer to a power source of an electrical distribution system, and the feed-through load terminals are intended to be connected to provide the electrical power to downstream receptacles, lighting fixtures, switches, and the like. Receptacle load terminals are electrically connected to the feed-through load terminals. The receptacle load terminals are configured to align with the blades of an attachment plug in order to provide source power by way of the plug to a user attachable load. Protective devices typically include a circuit interrupter that connects the line terminals to the load terminals in the reset state and disconnects the line terminals from the feed-through and receptacle load terminals in the tripped state. The circuit interrupter trips when a fault condition occurs. There are various types of protective devices including ground fault circuit interrupters (GFCIs), ground-fault equipment protectors (GFEPs), and arc fault circuit interrupters (AFCIs). Some protective devices include both GFCIs and AFCIs.

A protective device may be miswired during installation by connecting the load terminals to AC power. When this happens, the circuit interrupter may be unable to interrupt the flow of electrical current to the receptacle terminals when a fault condition is present. Unfortunately, protective devices do not typically alert the user to the miswire condition. Thus, it is not until damage or injury occurs that the miswired condition is evident. As noted above, receptacle load terminals and the feed-through load terminals may be permanently connected by an electrical conductor. When a device is properly wired, the circuit interrupter typically includes a single breaker that breaks the connection between the line terminals and both the feed-through load terminals and the receptacle load terminals. In other words, the typical protective device is not configured to remove power from the user load when a hazardous fault condition is extant. Accordingly, when a receptacle type device is reverse wired, unprotected AC power may be available at the receptacle load terminals when the circuit interrupter is in the tripped state.

In one approach that has been considered, a protective device may be equipped with a fuse that is configured to prevent circuit interrupter reset until AC voltage is provided to the line terminals. The fuse circuit prevents reset of the device and denies power to the feed-through load until proper wiring is effected. Once proper wiring is effected, the fuse blows and is no longer available to detect a reverse-wired condition if there is a reinstallation. Again, making matters worse, the installation instructions are likely to be lost and not available for any re-installation.

In another approach that has been considered, a protective device may be equipped with one or more sets of isolating contacts disposed between the feed-through load terminals and the receptacle load terminals. In this approach, the set of isolating contacts may be controlled by a miswire detection circuit. In the event of a miswire condition, the miswire detection circuit is configured to either open (or prevent closure) of the isolating contacts. After a proper wiring condition is detected, the miswire detection circuit is configured to either close (or permit closure) of the isolating contacts. Like the other approaches considered above, the miswire detection circuit is ineffectual after an initial proper installation, and is no longer available to detect a reverse-wired condition during any reinstallation. Thus, the isolating contacts are closed in spite of a reverse wired condition.

What is needed is a protective device that denies power to the protected circuit, including receptacle terminals, during a miswired condition. Further, a protective device, responsive to the miswired condition during each and every installation, is needed.

SUMMARY OF THE INVENTION

The present invention addresses the needs described above by providing a protective device that denies power to the protected circuit, including receptacle terminals, during a miswired condition. Further, a protective device, responsive to the miswired condition during each and every installation.

One aspect of the present invention is directed to an electrical wiring device for use in an electrical distribution system. The electrical distribution system includes a plurality of line conductors coupled to an AC power source and a plurality of load conductors. The device includes a plurality of line terminals and a plurality of load terminals configured to terminate the plurality of line conductors and the plurality of load conductors in a wiring state. The wiring state is in a properly wired condition when the plurality of line conductors are terminated to the plurality of line terminals and the wiring state is in a miswired condition when the plurality of line conductors are terminated to the plurality of load terminals. A protective circuit assembly is coupled to the plurality of line terminals or the plurality of load terminals. The protective circuit assembly includes at least one fault detector configured to generate a fault detection signal based on electrical perturbations propagating on at least one of the plurality of line terminals or at least one of the plurality of load terminals. A circuit interrupter assembly is coupled to the protective circuit assembly. The circuit interrupter includes a plurality of interrupting contacts configured to establish continuity between the plurality of line terminals and the plurality of load terminals in a reset state in response to a reset stimulus and establish a discontinuity between the plurality of line terminals and the plurality of load terminals in a tripped state in response to a trip stimulus including the fault detection signal or a miswiring state signal. A processing circuit is configured to determine the wiring state based on detecting a wiring state parameter at the plurality of line terminals during a predetermined period after the tripped state has been established. The processing circuit is configured to store a wiring state indicator in a wiring state register based on a wiring state determination. The wiring state register is preset to trip the circuit interrupter when the AC power source is applied by an installer to the plurality of line terminals or the plurality of load terminals for the first time.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1A:
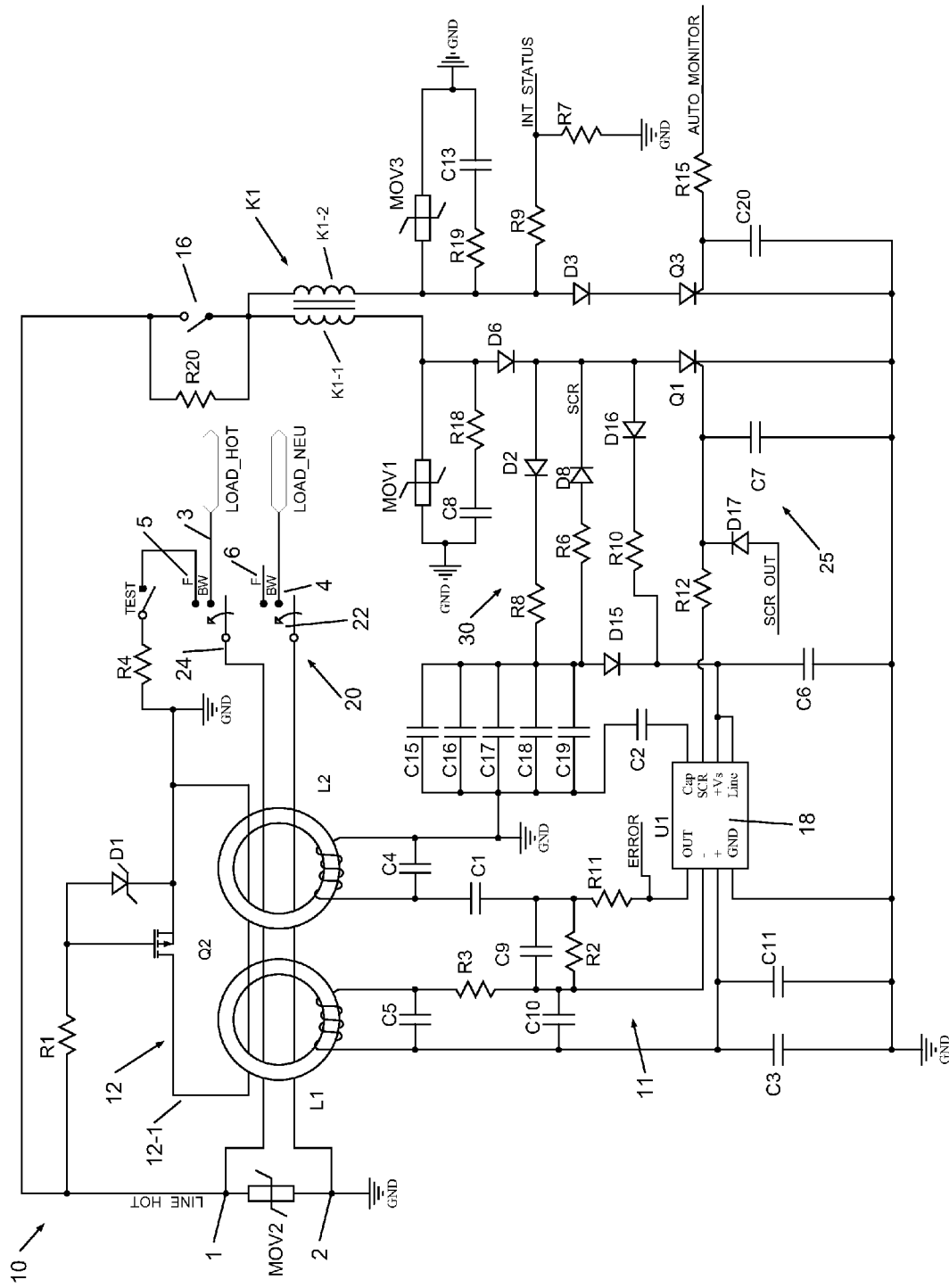
FIG. 1A is a schematic view of a protective device in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protective device of the present invention is shown in FIG. 1, and is designated generally throughout by reference numeral 10.

As embodied herein, and depicted in FIG. 1A, a schematic view of a protective device 10 in accordance with one embodiment of the present invention is disclosed. The ground fault circuit 10 includes a differential transformer L1 which is configured to sense load-side ground faults, i.e. ground faults located in loads connected to load terminals (3, 4) or receptacle contacts (5, 6) and transformer L2, which is configured as a grounded neutral transmitter that is configured for grounded-neutral fault detection. Both differential transformer L1 and grounded-neutral transformer L2 are coupled to the fault detector integrated circuit 18 by way of circuitry 11. Detector 18 receives power from a dual power supply circuit 30 that is described in greater detail below.

The output of the detector 18 is connected to the control input of SCR Q1. When SCR Q1 is turned ON, the GFCI solenoid K1-1 of dual-solenoid K1 is energized to actuate the circuit interrupter 20 such that the circuit interrupter 20 and the auxiliary switch 16 are tripped (opened). Solenoid K1 remains energized for a time period that is typically less than about 25 milliseconds. When the circuit interrupter 20 trips, the line terminals (1, 2) are disconnected from their respective load terminals (3, 4) or receptacle contacts (5, 6). After the fault condition has been eliminated, the circuit interrupter 20 may be reset by way of a reset button.

The grounded neutral transmitter L2 is configured to detect a grounded neutral condition. (The line neutral conductor 2 is typically grounded in the electrical circuit at the panel—this does not constitute a grounded neutral fault condition). When a grounded neutral condition is not present, the grounded neutral transmitter L2 is configured to couple equal signals into the hot and neutral conductors. Because the differential transformer L1 is configured to sense a current differential, the equal signals provided by the grounded neutral transmitter L2 effectively cancel each other out. On the other hand, a grounded neutral condition does occur when the load neutral conductor (i.e., the conductor that is connected to load neutral terminal 4 or neutral receptacle contact 6) is accidentally grounded. This creates a parallel conductive path (relative to the neutral return path) between the neutral line terminal 2 and neutral load terminal 4. As a result, another signal circulates around this current loop and it is coupled onto the neutral conductor (but not the hot conductor) to create a differential current. The differential transformer L1 senses the differential current between the hot and neutral conductors and the detector 18 generates a fault detection signal in response thereto. The fault detection signal trips the circuit interrupter 20. When tripped, circuit interrupter 20 decouples the hot terminals (1,3,5) by way of contacts 24 and neutral terminals (2,4, 6) by way of contacts 22. After the fault signal is removed the circuit interrupter 20 may be manually reset by way of a reset button (not shown) that closes neutral contacts 22 and hot contacts 24. Thus when circuit interrupter 20 is in the reset state, terminals (1,3,5) are interconnected by hot contacts 24 and neutral terminals (2,4,6) are interconnected by neutral contacts 22. Auxiliary switch 16 opens when circuit interrupter 20 is in the tripped state and closes when the circuit interrupter is in the reset state.

In reference to the dual power supply circuit 30, it is provided to accommodate the needs of both the detection function (described above) and the universal auto-test function described below. Dual supply 30 includes a first power supply portion that includes diode D2 in series with resistor R8. The series circuit is disposed between the cathode of diode D6 and the anode of diode D15. The first power supply portion is thus connected to line hot via diode D6 and solenoid K1 and is further configured to provide power to the supply terminal of detector 18 via diode D15. Diode D6 is further connected to the second power supply portion that includes diode D16 in series with resistors R10. This series circuit is connected to the cathode of diode D15. The second power supply portion is configured to charge capacitor C2 whereas the first power supply portion is configured to charge the parallel capacitor bank (C15-C19). The total capacitance of the capacitor bank (C15-C19) is greater than that of capacitor C2. The capacitor bank (C15-C19) has enough stored energy to maintain the power supply voltage during the negative half cycle auto-test. When the AC line cycle is negative, the diode D15 is forward biased, thereby coupling capacitor bank (C15-C19) to capacitor C6.

Because the power supply is active during the negative half cycle, detector 18 is also responsive to the auto-test.

When the GFCI 10 detects a fault condition, it is configured to interrupt the circuit interrupter 20 during the positive half-cycle of the AC line cycle. In order to meet the trip time requirements, the second power supply portion (D16, R10) is configured to charge to the full supply voltage in less than about 2 milliseconds. This means that during the positive half cycles, a hazardous ground fault condition is detected and interrupted quickly. On the other hand, the first power supply portion (D2, R8) takes longer to come up to full charge due to the large value of capacitor bank (C15-C19). This power supply (D2, R8) charges with a time constant that is approximately 15 milliseconds. However, due to reverse biasing of diode D15, the second power supply portion (D16, R10) is not prevented from charging quickly. In summary, detector 18 relies on the second power supply (D16, R10) during the positive half cycles for ground fault detection and relies on the first power supply (D2, R8) for auto-testing during the negative half cycles.

At this point, it is helpful to bring the universal auto-test circuit 12 into the discussion since one of the purposes of the dual power supply 30 is to support the auto-test circuit 12. The auto-test circuit 12 generates a simulated grounded neutral test signal by way of wire loop 12-1 when FET Q2 is turned ON. When FET Q2 is turned ON, the grounded neutral transmitter L2 produces an oscillating signal that is a function of the full power supply voltage. The ON state resistance of FET Q2 is less than about 4 Ohms. Thus, the wire loop 12-1, in combination with the FET Q2 (in the ON state), forms a loop that passes through the differential transformer L1 and neutral transmitter L2 to simulate a grounded neutral condition. In an alternate embodiment, instead of having a third wire passing through the transformers (L1, L2) the wire loop 12-1 may incorporate a portion of the neutral conductor that is disposed between line neutral terminal 2 and load neutral terminal 4. One advantage for placing the third wire within the wire loop relates to improved noise immunity. When the third wire is employed, the wire loop 12-1 and the neutral conductor are isolated such that the current propagating in wire loop 12-1 during the self-test is not affected by voltage drops or electrical noise propagating in the neutral conductor. Noise propagating on the neutral conductor could otherwise impair the test fault signal and its detection by the GFCI.

The timing of the FET ON state is controlled by the timing resistor R1. In one embodiment of the present invention, the FET Q2 is turned ON near the conclusion of the positive half cycle of the AC power source and remains ON through a portion of the negative half cycle to produce the test fault signal. The grounded neutral transformer L2 generates a differential current in response to the test current propagating in wire loop 12-1. The differential current is, in turn, sensed by transformer L1. If the circuit is working properly, the sensor signal provided by L1 should be deemed by detector 18 as a fault. As described above, during normal operation and when the GFCI 10 is operating properly, the fault detector 18 provides a fault detection signal that is sufficient to turn SCR Q1 ON. However, the auto-test is performed during the negative half cycle or late in the positive half cycle such that SCR Q1 will not be turned ON during the positive half cycle at a time that could cause nuisance tripping of the circuit interrupter. In one embodiment, SCR Q1 is turned ON late in the positive half-cycle of the AC line cycle where the amount of current flowing through the SCR Q1 is not sufficient to energize the GFCI solenoid K1-1 of dual solenoid K1. In another embodiment, Q1 is turned ON during the negative half cycle, remaining ON until power supply 30 is sufficiently discharged before the next positive half cycle, that occurring before the start of the next positive half cycle. Moreover, SCR Q1 is prevented from conducting current through dual-solenoid K1-1 during the negative half cycle by diode D6.

One reason for using a relatively lengthy time duration for the simulated fault signal generated by loop 12-1 is to ensure that detector 18 has sufficient time to detect the self-test. One drawback to this approach relates to the duration of the magnetic flux in the sensor core. Specifically, if the magnetic flux in the core carries over into the subsequent positive half cycle, the resultant sensor output would cause detector 18 to improperly turn SCR Q1 ON and nuisance trip the device 10. For this reason, the output voltage of the dual power supply 30 is collapsed before the conclusion of the negative half cycle. One reason why the collapsible power supply voltage prevents nuisance tripping relates to the inability of grounded neutral oscillations to persist in the absence of the power supply output voltage. Even when FET Q2 is turned ON, there is substantially no magnetic flux in the sensor core once the power supply voltage collapses. Thus, if the power supply voltage 30 is collapsed before the conclusion of the negative half cycle, the grounded neutral oscillations that otherwise would be generated by FET Q2, cannot carry over into the positive half cycle. Thus, the collapse of dual power supply 30 prevents nuisance tripping by the auto-test function.

Finally, the reader should note that the GFCI power supply 30 is in series with the auxiliary switch and the solenoid K1. When the auxiliary switch 16 is closed, the inductance of the solenoid K1 protects the GFCI power supply from lightning surges that could otherwise damage the GFCI. On the other hand, the auxiliary switch 16 protects the solenoid K1-1 should SCR Q1 short out because it interrupts power to the GFCI circuit when the circuit interrupter 20 trips. Likewise, the auxiliary switch 16 protects the other solenoid K1-2 when SCR Q3 shorts out because it interrupts power to the self test circuit when the circuit interrupter 20 trips.

The nuisance tripping prevention feature is now described in greater detail. During the self-test, FET Q2 is turned ON and the grounded neutral transmitter L2 produces an oscillating signal that is a function of the full power supply voltage. If the detector 18 is operational, SCR Q1 is turned ON at about 225°-280° of the AC line cycle (i.e., during a portion of the negative half cycle). As a result, capacitor C2 and capacitor bank C15-C19 are dump-discharged via SCR Q1, diode D8, and resistor R6 to thereby collapse the output voltage of the power supply. The discharging process occurs gradually because of the time constant associated with capacitor bank C15-C19. As the power supply voltage gradually collapses in accordance with the aforementioned time constant, the magnitude of the oscillating signal produced by the grounded neutral transmitter L2 also diminishes. In turn, the grounded neutral simulation current propagating around loop 12-1 is also reduced. Finally, the flux in the transformer core is so low that the sensor signal it provides to the fault detector 18 does not represent a fault condition. The above stated process transpires before the conclusion of the negative half cycle. Accordingly, little or no flux is present in the transformer core at the start of the subsequent positive half cycle. In one embodiment of the present invention, the capacitor bank C15-C19 time constant is about 0.5 milliseconds and the period of the grounded neutral oscillation is about 0.15 milliseconds.

The GFCI circuit also includes three movistors (MOV1, MOV2 and MOV3) that are configured to protect the GFCI from lighting surges. MOV1 serves to protect the low voltage circuitry. MOV 2 and MOV 3 protect the GFCI circuit and the self-test circuit. Since MOV1 is disposed across-the-line it is relatively large (12 mm) in size to withstand surges. Since MOV2, MOV3 are in series with the GFCI solenoid K1-1 and the self-test solenoid K1-2, respectively, they may be relatively smaller in size (e.g., 5 mm). The inductances of the dual solenoid K1 serves as a high frequency filter that limits the surge energy that MOV2 and MOV3 must absorb in the event of a lightning strike.

Figure 1B:
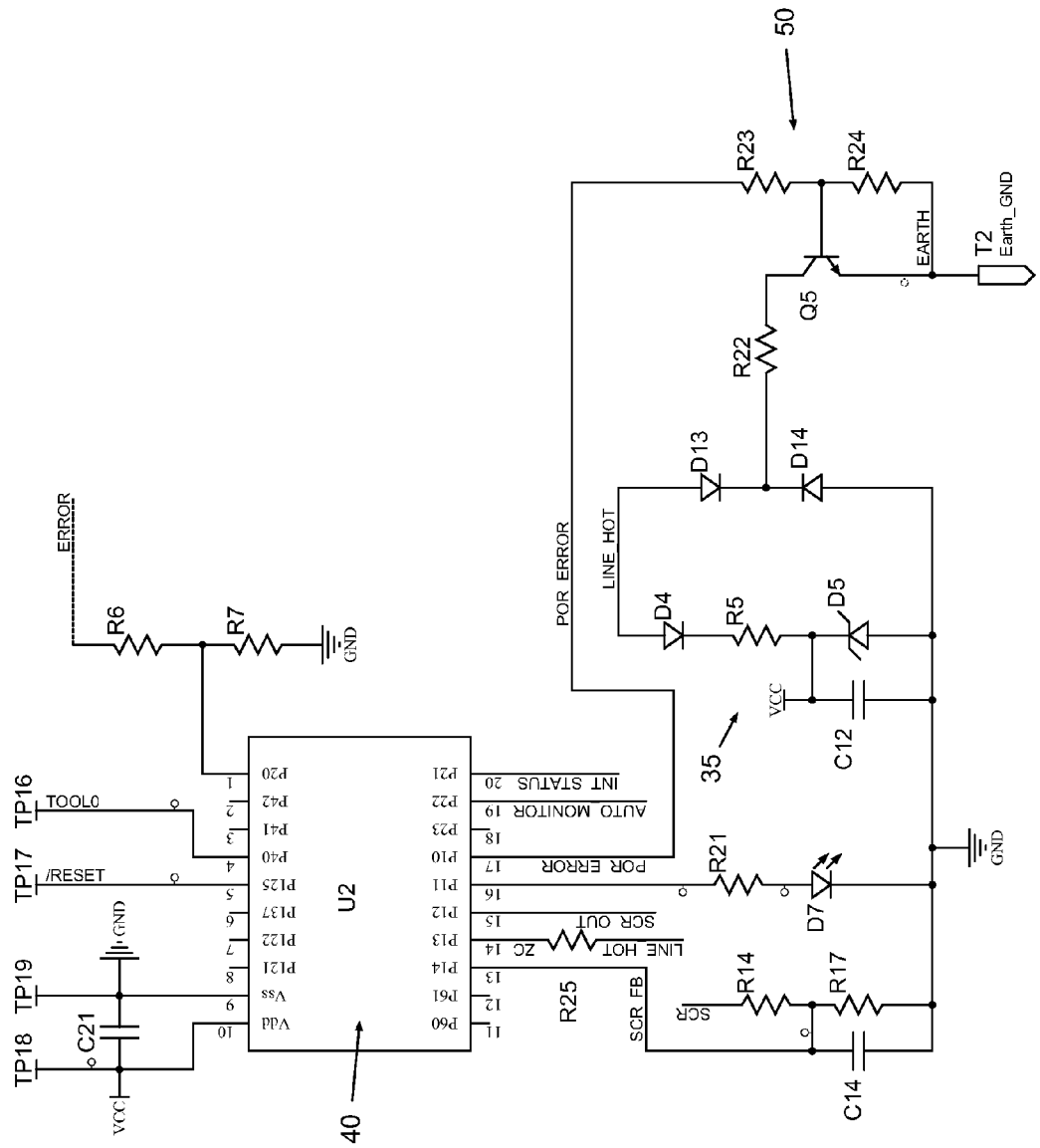
FIG. 1B is a schematic view of the microcontroller portion of the protective device depicted in FIG. 1A.

Referring to FIG. 1B, a schematic view of the microcontroller 40 portion of the protective device depicted in FIG. 1A is disclosed. In one embodiment the microcontroller 40 may be implemented by a processor such as the Renesas R5F10266. The processor 40 provides a 1 MHz clock signal that is used for digital clocks and other internal timing signals. The processor 40 is a 16-bit microcontroller that is widely used in embedded processor designs. The processor 40 includes 2 kB ROM to store the firmware and 2 KB Flash memory to implement the wiring state register.

It will be apparent to those of ordinary skill in the pertinent art that modifications and variations can be made to the processor 40 of the present invention depending on the degree of processing sophistication. The embedded processor 40 includes on-board memory that typically includes random access memory (RAM) and read only memory (ROM). The embedded processor 40 functions may be implemented using hardware, software, embedded processors, signal processors, RISC computers, application specific integrated circuits (ASICs), field programmable gate array (FPGA) devices, gate array state machines, customized integrated circuits and/or a combination thereof. The RAM memory may have battery back-up. Thus, the embodiments of the present invention are not limited to any specific combination of hardware circuitry and/or software. Taken together, RAM and ROM may be referred to herein as "computer-readable media." The term "computer-readable medium," as used herein, refers to any medium that participates in providing data and/or instructions to the processor for execution. For example, the computer-readable media employed herein may include any suitable memory device including SRAM, DRAM, NVRWM, PROM, E²PROM, Flash memory, or any suitable type of memory. The Flash memory or RAM with battery back-up are examples of non-volatile memory that is provided herein to store the wiring state of the device for multi-use miswire purposes.

Turning now to the processor 40, note that pin 14 of the processor 40 is a zero cross input, coupled through R25 to line hot. Although processor 40 has its own clock, due to its high operating frequency typically above about 1 MHz it is not practical to use it for counting timing intervals that are lengthy. Pin 14 allows time to be counted in a coarser way, i.e., using the line cycle as a timing signal. Thus, the coarse timing signal may support a recycling indicator that may be cycled approximately every second. End of life decisions may also be made using the coarse timing signal. The self-test function described above may require a test acceptance signal within a predetermined period of time, ranging over a period of about 3 line cycles to 3 hours. In addition, the zero cross signal also allows processor 40 to synchronize the self test signal with the AC power source, e.g., to occur during the negative half cycle.

Pin 13 of the processor 40 is a GFCI monitoring input which is coupled to the anode of SCR Q1. As mentioned above, when the self-test function is performed, the SCR Q1 is actuated during the negative half-cycle. This signal is registered by the processor 40 as a test acceptance signal, i.e., the GFCI is working properly. Every time pin 13 goes low, an internal "end-of-life" timer in processor 40 is reset. Note however, that pin 13 is also coupled to a filter circuit (R14, C14 and R17). The filter removes high frequency noise that might falsely indicate that the device 10 passed the end of life test. If the end-of-life timer is not reset within the preprogrammed time frame, it signals the CPU in processor 40 that and end-of-life condition has been reached. The CPU causes pins 16 and 19 to go high. Pin 16 is connected to the indicator LED D7. Pin 19 is coupled to self test solenoid K1-2 by way of diode D3, filter circuit (R15,C20) and SCR Q3.

Pin 17 provides a power-on-reset (POR) capability. Pin 17 is coupled to ground terminal T2, R24, R22, R23, D13, D14 and Q5. Briefly, the processor 40 turns Q5 ON momentarily to inject a test signal into a ground conductor disposed in the electrical distribution system connected to T2. The power-on-reset (POR) pin 17 is employed in a variety of ways that are described below in reference to FIGS. 2A-2H.

As noted briefly above, pin 16 drives a multi-purpose indicator D7. The processor 40 can be programmed to drive indicator D7 to provide multiple indications including a trip indication, a reset indication, an end-of-life indication, a night-light capability, and/or a ground continuity indication. The indicator D7 is shown as a visual indicator (LED), but those skilled in the art will appreciate that it may be implemented as an audible indicator or as both an audible and visual indicator. When an end of life condition is detected, the indicator D7 may provide a cyclical or oscillating indication to alert the user that power denial is imminent. After a predetermined interval, the power denial is implemented to trip the GFCI. Once tripped, the GFCI cannot be reset. In another embodiment the GFCI can be reset, however the GFCI trips again after another predetermined interval. The indicator D7 may also be used to indicate a POR test failure and provides a unique display that is distinguishable from a self-test end of life condition. In one embodiment of the invention, the POR failure is displayed as recurring double blinks or double beeps.

Pin 20 is the INT STATUS pin, and provides the processor 40 with the status of the interrupting contacts 20. It does so in an indirect manner, monitoring the open or closed status of auxiliary switch 16. An advantage for indirect monitoring is that no circuitry has to be connected to the load side terminals. Such circuitry would have to be isolated so that the decoupling of the line terminals (1, 2) from the load terminals (3,4,5,6) when circuit interrupter 20 is in the tripped state is not compromised. Thus the need for expensive isolation circuitry is avoided. Another advantage is that pin 20 is also monitoring the auxiliary switch 16 for an end of life condition. In particular, pin 20 is connected to resistors R7, R9 and R20, as well as the self-test portion solenoid K1-2 of dual solenoid K1. When the auxiliary switch 16 is open, the voltage is low at pin 20 due to the voltage dividing action of R7 over series resistors R9 and R20. When the auxiliary switch 16 is closed, the voltage at pin 20 is high.

Auxiliary switch 16 and dual solenoid K1 protect the circuitry as follows. When the auxiliary switch 16 is closed, the inductance of the self-test solenoid K1-2 protects R7, R9, R20 and pin 20 from lightning surges. Note also that the auxiliary switch 16 interrupts power to both windings of the dual solenoid K1 in the tripped state. This means power to the self-test solenoid K1-2 is interrupted to protect it from burning out if SCR Q3 shorts out (fails.) Likewise, power to the GFCI solenoid K1-1 is interrupted to protect it from burning out if SCR Q1 shorts out (fails). Without auxiliary switch 16, if either solenoid were to burn out, a fault condition could persist indefinitely; K1 would not be able to drive the circuit interrupter 20 to interrupt it. However, by including the auxiliary switch the circuit interrupter keeps tripping each time reset is attempted. That means the risk of unprotected power being provided to the load terminals due to the shorted condition is avoided.

Pin 19 is the AUTO_MONITOR input and is used to trip the circuit interrupter via the self-test solenoid K1-2. In reference to FIG. 1A, the AUTO_MONITOR input is coupled to the control input of SCR Q3 via resistor R15 and capacitor C20. The anode of Q3 is connected to solenoid K1 via diode D3. In an alternate embodiment, pin 17 may be connected to diode D17 (See FIG. 1A) and may be employed to turn SCR Q1 ON in the event of an end of life condition. Thus both sides of the dual solenoid (K1-1, K1-2) may be used to trip the interrupter 20 to ensure that the device 10 is tripped at end-of-life.

Pin 10 (VCC) is coupled to a redundant processor power supply 35 and derives power from the line side of the interrupting contacts. The components of the processor power supply 35 are connected to LINE HOT and include D4, R5, D5, and C12. The processor power supply 35 allows the self-test circuit to operate if there is an end of life condition in the GFCI power supply 30 (See FIG. 1A). The reader should note that GFCI power supply 30 is deenergized in the tripped state. See above. However, since the processor 40 has its own power supply 35 receiving power from terminal 1 rather than by way of auxiliary switch 16, it is functional in the tripped state.

The present invention provides miswiring protection capabilities. Only one bit of non-volatile memory is required for this function although the system memory may include more. The one-bit memory, i.e., the wiring state register, is used to store the wiring state of the device. (1=proper wiring, 0=miswiring). Thus, when the wiring state register stores a ONE (1), the processor 40 allows the circuit interrupter 40 to be reset (assuming that an end-of life state is not extant). However, if the wiring state register is LOW, it indicates a miswired condition and the circuit interrupter 20 cannot remain reset because the processor will keep tripping the interrupter until the proper wiring is achieved and the memory bit is set to a HIGH state. As described above, the wiring state register is implemented using flash memory in one embodiment of the invention.

While a GFCI device is being manufactured, one of the final assembly steps before the device enters the stream of commerce is to write a logic zero into the wiring state register. This is accomplished by the following sequence. A source voltage is applied to the load terminals to simulate a miswired condition. The GFCI power supply 30 and the self-test power supply are energized by resetting the circuit interrupter 20. A simulated fault condition is applied to trip the device (this may be accomplished by depressing the test button.) When the interrupting contacts 20 are tripped, the INT STATUS pin 20 goes LOW and the zero cross input pin 14 stops providing zero cross data. The processor 40 will function for about two line cycles before the voltage of the self-test power supply starts to decay. In that time, the processor 40 interprets the absence of zero cross data in the tripped state as an indication that device 10 is miswired, and thus sets the one bit memory to a logic ZERO state. Subsequently, processor 40 directs SCR Q3 to trip the circuit interrupter 20 via the self-test solenoid K1-2 every time reset is attempted. The one bit memory will remain in the logic ZERO state in perpetuity until the processor 40 detects a proper wiring condition and sets the value of the one bit register equal to a logic ONE.

The wiring state register is set to a logic ONE in accordance with the following sequence. Obviously, an AC power source must be applied to the line terminals. The GFCI is initially tripped (if not tripped already) by depressing the test button. When properly wired, the zero cross data is provided to processor 40 even when the device is tripped. Thus, processor 40 reads pin 14 (ZC) and pin 20 (INT STATUS) and interprets the receipt of zero cross data in the tripped state as an indication that the device 10 is properly wired. The processor 40 writes a logic ONE value to the wiring state register and allows the device to remain in the reset state after the user resets device 10.

If the device 10 is removed from service and subsequently reinstalled properly, the processor will read the logic ONE value in the wiring state register and allow reset. On the other hand, if the device is miswired upon reinstallation, the processor is programmed to perform the wiring state detection test described above in response to the consumer's operation of the test button.

In another embodiment of the invention the one bit memory is configured oppositely such that the logic ZERO state represents the proper wiring condition and the logic ONE state represents the miswired condition.

If the wiring state detection test fails (i.e., there is a miswiring condition), the processor 40 relies on the self-test routine to cause the detector 18 to trip the circuit interrupter 20. In another embodiment of the invention, processor 40 can be programmed to use the AUTO_MONITOR pin to direct SCR Q3 to trip the device without generating a simulated fault condition. In another embodiment described above, pin 17 can be connected to diode D17 (See FIG. 1A) and may be employed to turn SCR Q1 ON in the event of a miswiring condition.

Referring to FIGS. 2A-2H, diagrammatic depictions illustrating the automatic multi-use miswiring detection features of the present invention are disclosed. In particular, these features are related to the functionality of the POR circuit 50 (pin 17) depicted in FIG. 1B. FIGS. 2A-2H, provide simplified diagrams that are meant to help the reader's understanding of this subject matter. In each depiction, circuit interrupter 20 is shown in the reset position.

Figure 2A:
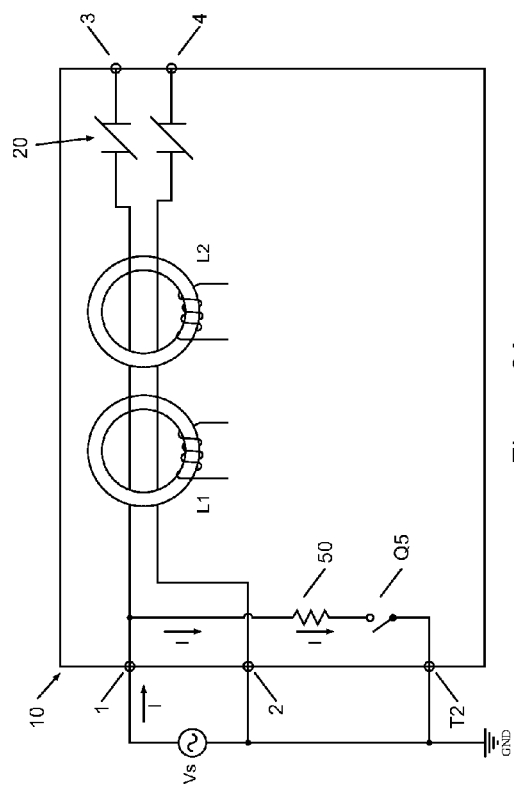
FIG. 2A-2H are diagrammatic depictions illustrating the automatic multi-use miswiring detection features of the present invention.

In FIG. 2A, GFCI 10 is properly wired. The ground circuit 50 (See FIG. 1A) is disposed on the line side of L1 and is connected to ground through electronic switch Q5. Q5 is automatically and momentarily closed each time processor 40 transitions from a deenergized state to an energized state. S1 is timed to close during the positive half cycle. While Q5 is closed, the ground circuit 50 injects a circulating current (I) through the line hot and ground wires to simulate a ground fault condition. In one embodiment of the invention ground circuit 50 includes a 15K Ohm resistor. This current does not circulate through L1 and so there is no L1 output signal and the circuit interrupter does not trip.

Figure 2B:
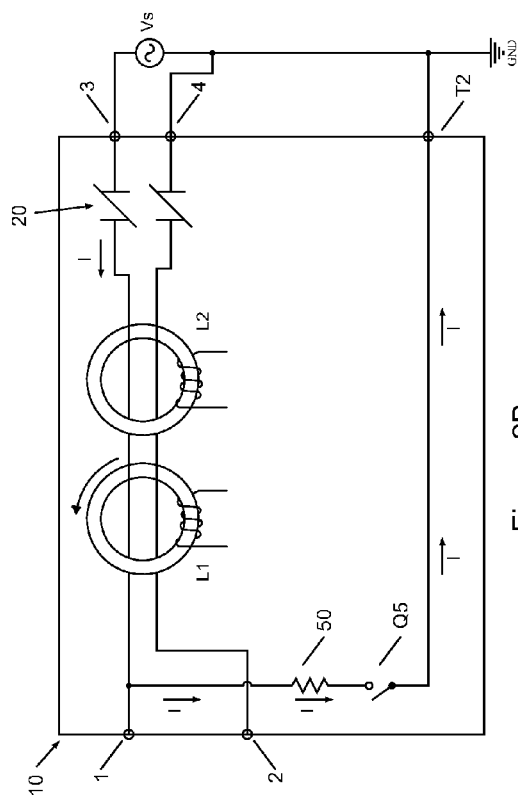

In FIG. 2B, GFCI 10 is miswired. In this case, the ground current (I) circulates through L1 and is detected by L1 as differential current. Detector 18 turns ON SCR Q1. Since Q5 is closed during the positive half cycle, SCR Q1 turns ON during the positive half cycle and circuit interrupter 20 is tripped by way of GFCI solenoid K1-1. Each time the reset button is actuated the circuit interrupter will reset, however the circulating current resumes, and the interrupter 20 trips again. This process keeps repeating itself. The interrupter will remain reset and provide power only if the miswiring issue is corrected by the installer.

Figure 2C:
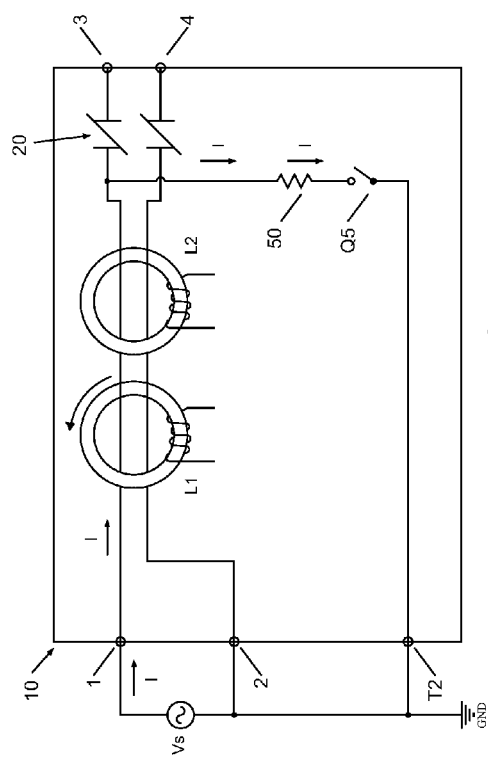
Figure 2D:
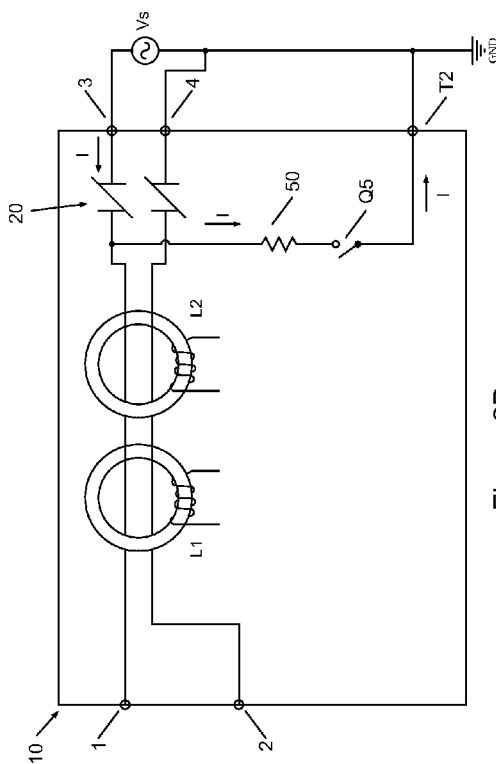

FIGS. 2C and 2D show another embodiment of the automatic multi-use miswire circuitry. In this embodiment, the ground circuit 50 is disposed on the load side of L1 and Q5 closes at a point in the AC line cycle where the circuit interrupter cannot trip (e.g., late in the positive half cycle or during the negative half cycle of the line frequency). When the closure occurs late in the positive half cycle there is not enough line voltage for the GFCI solenoid to release the trip mechanism. When the closure occurs in the negative half cycle, D6 is reverse biased and so even if SCR Q1 turns on, the GFCI solenoid K1-1 will not energize. FIG. 2C shows the GFCI being properly wired and L1 detecting the circulating current (I.) SCR Q1 turns ON but GFCI solenoid K1-1 does not trip circuit interrupter 20. Processor 40 recognizes the fact that SCR Q1 has turned ON and nothing happens. On the other hand, FIG. 2D shows the GFCI in a miswired state. This time the circulating current (I) does not get detected by L1 and so SCR Q1 does not turn ON. Processor 40 treats the failure to turn ON as it would an end of life condition and sends a signal to auto monitor pin 19 to turn ON SCR Q3 on to trip circuit interrupter 20 via self test solenoid K1-2 early in a positive half cycle.

Figure 2E:
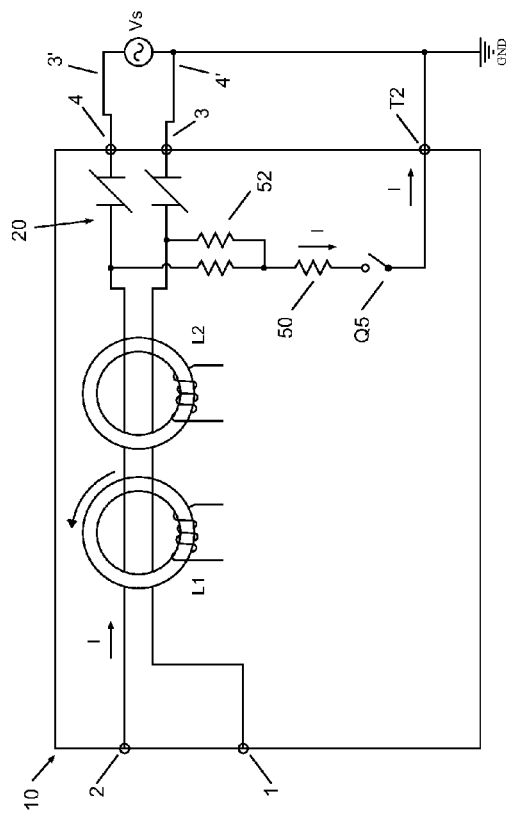

In FIG. 2E, another embodiment of the automatic miswire circuit is shown. This circuit configuration provides miswire protection even if there is a reverse polarity condition (transposition of the hot and neutral conductors from the AC voltage source.) As shown in FIG. 2E, the neutral conductor 4' is connected to the load hot terminal 3 and the hot conductor 3' wire is connected to the load neutral terminal 4. As such, FIG. 2E shows both a reverse polarity condition and a miswired condition. The multi-use miswire circuit is similar to the embodiment shown in FIGS. 2C-D except ground circuit 50 is coupled to line terminals (1,2) via a voltage divider. That means the circulating current (I) will flow even when there is reverse polarity condition. In the manner of FIGS. 2C-D, the circulating current is not detected by L1 when there is a miswired condition which results in the circuit interrupter being tripped. However, the circulating current is detected when there is a proper wiring condition, and nothing happens.

The embodiment of FIG. 2C-D will not generate the circulating current under reverse polarity and so the circuit interrupter, even if properly wired, will not stay reset. This can be a safety feature in certain instances where reverse polarity presents a shock hazard, e.g., hazards that arise in certain appliances having polarized plugs.

The POR feature also protects against an open ground condition. The open ground condition can be caused by a poor electrical connection to terminal T2 or the installation not having a ground conductor at all. In the embodiments shown in FIGS. 2C-D, and 2E, the absence of circulating current (which happens if there is an open ground condition) causes the circuit interrupter to trip and not provide power to the load terminals.

Figure 2F:
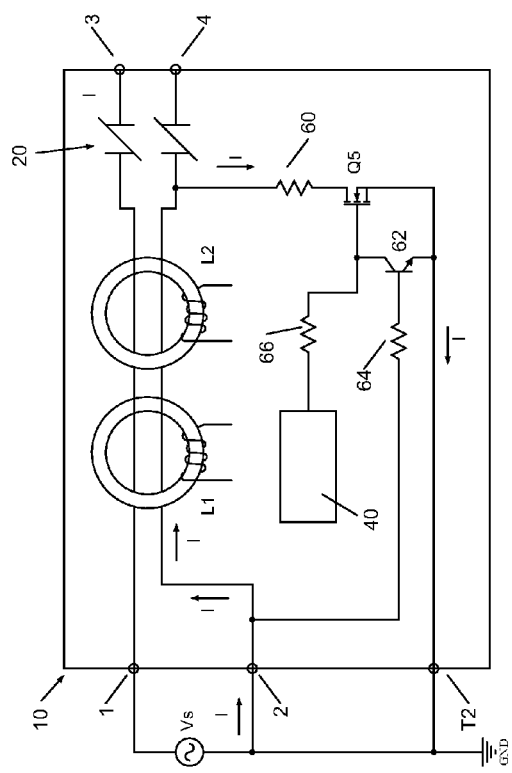

Another embodiment of the power on reset (POR) feature is shown in FIG. 2F. Here, the power on reset fault is a simulated grounded neutral condition involving the ground conductor and neutral conductor. The simulated grounded neutral resistor 60 is less than about 4 Ohms, orders of magnitude less than the resistance employed in ground fault simulation circuits, e.g. ground circuit 50 includes a 15,000 Ohm resistance. As such, the simulated grounded neutral approach is capable of detecting an open ground condition at a lower value of impedance. In other words, the simulated ground neutral approach can detect open ground conditions that the simulated ground fault approach might fail to detect.

If the phase and neutral source conductors happen to be reverse polarized, resistor 60 would be disposed across the voltage source when FET Q5 turns ON and burn out. To prevent that from happening, transistor 62 is connected between line neutral terminal 2 and ground terminal T2 in series with resistor 64. Thus transistor 62 will be OFF when there is a correct polarity condition and ON when the hot conductor is connected to terminal 2 in the reverse polarity condition. Transistor 62 is what prevents FET Q5 from turning ON during the reverse polarity condition. When transistor 62 is OFF, FET Q5 is responsive to signals from processor 40 to turn ON.

The embodiment of FIG. 2F will not operate when there is a reverse polarity condition. This is because there will be no circulating current (I) even if the GFCI is properly wired. If it is desirable to have the grounded neutral simulation scheme still work under reverse polarity, transistor 62 when ON activates a reversing switch (not shown) that decouples resistors (60,64) from line neutral terminal 2 and then couples them to line hot terminal 1 where the neutral conductor is at (resistors (60,64) are still connected either side of transformers L1, L2). Consequently the circulating current (I) flows even though there is a reverse polarity condition, when the device is properly wired.

Figure 2G:
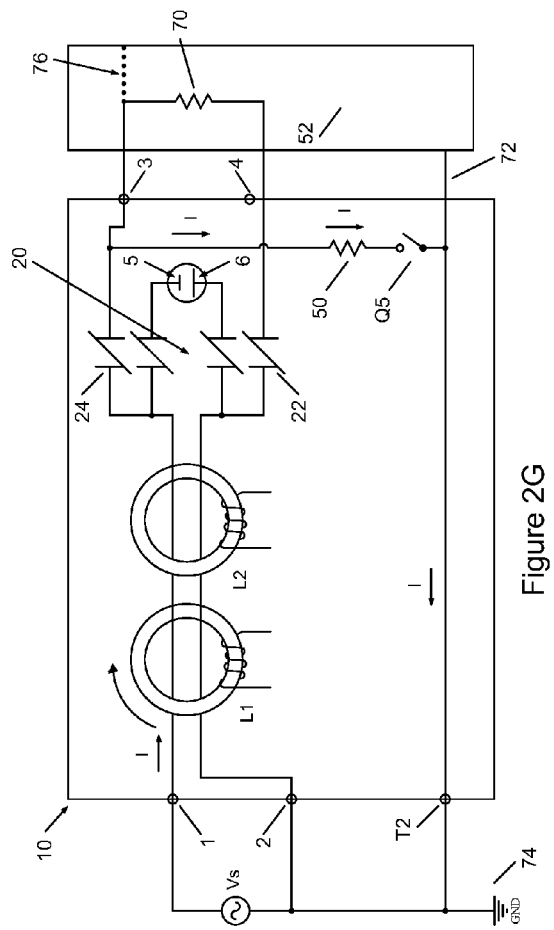

Another embodiment is shown in FIG. 2G, and illustrates that the simulation circuit 50 can be connected to the load side of the circuit interrupting contacts. The circuit operates similarly to the embodiment shown in FIGS. 2C-2D.

The embodiment of FIG. 2G illustrates the benefit of joining a ground continuity monitor to an interrupting device such as a GFCI. Although FIG. 2G is used, the benefit could have been demonstrated with other embodiments of the invention. A load 70 is connected to a set of load terminals (3,4.) Load 70 has a metallic housing 72 connected to ground terminal T2. If there is a discontinuity in the ground path between the ground at the panel 74 and terminal T2, and there is no circuit-interrupting provision, nothing happens. Then should a fault condition 76 occur between load 70 and the metallic housing 72, the user is exposed to risk of electric shock when touching the housing 72 with nothing to stop it. However, with the circuit interrupter, load power is interrupted when there is a ground discontinuity between terminal T2 and ground 74. When load 70 is decoupled from the power source there is no possibility of an electric shock due to the compromised insulation in load 70. As such, GFCI 10 protects the user from electric shock two ways: through assuring that the ground is present and through the ability to detect and interrupt a ground fault condition. Another benefit shown in FIG. 2G, is that the circulating current (I) passes through the set of interrupting contacts 24. Processor 40 recognizes that there is circulating current (I) via SCR Q1 turning ON and interprets this to mean via SCR OUT (pin 15) that circuit interrupter 20 is reset. However, processor 40 also monitors the state of the circuit interrupter by monitoring auxiliary switch 16 by way of INT STATUS (pin 20.) When there is disagreement between the two processor inputs (15, 20), i.e., one indicating reset while the other indicating tripped, processor 40 activates a trip command via one or both solenoids (K1-1,K1-2) or indicates an end of life condition in interrupter 20 via indicator D7. An example of a circuit interrupter end of life condition is welded power contacts.

Figure 2H:
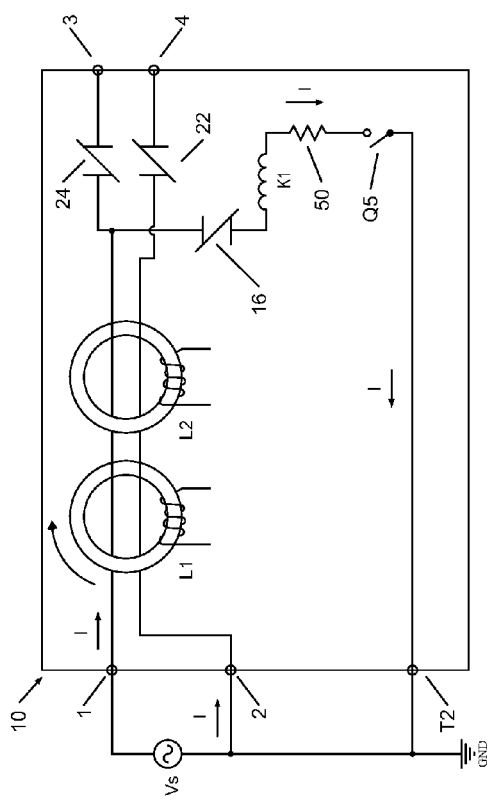

In FIG. 2H, the power-on-reset (POR) feature derives power from the auxiliary switch circuit 16 and solenoid K1-1 or K1-2. Referring back to FIG. 1A, the inductance of solenoid K1-1 and MOV1, or the inductance of solenoid K1-2 and MOV 3 protect ground component 50 and transistor Q5 circuit from lightning surges.

Figure 3:
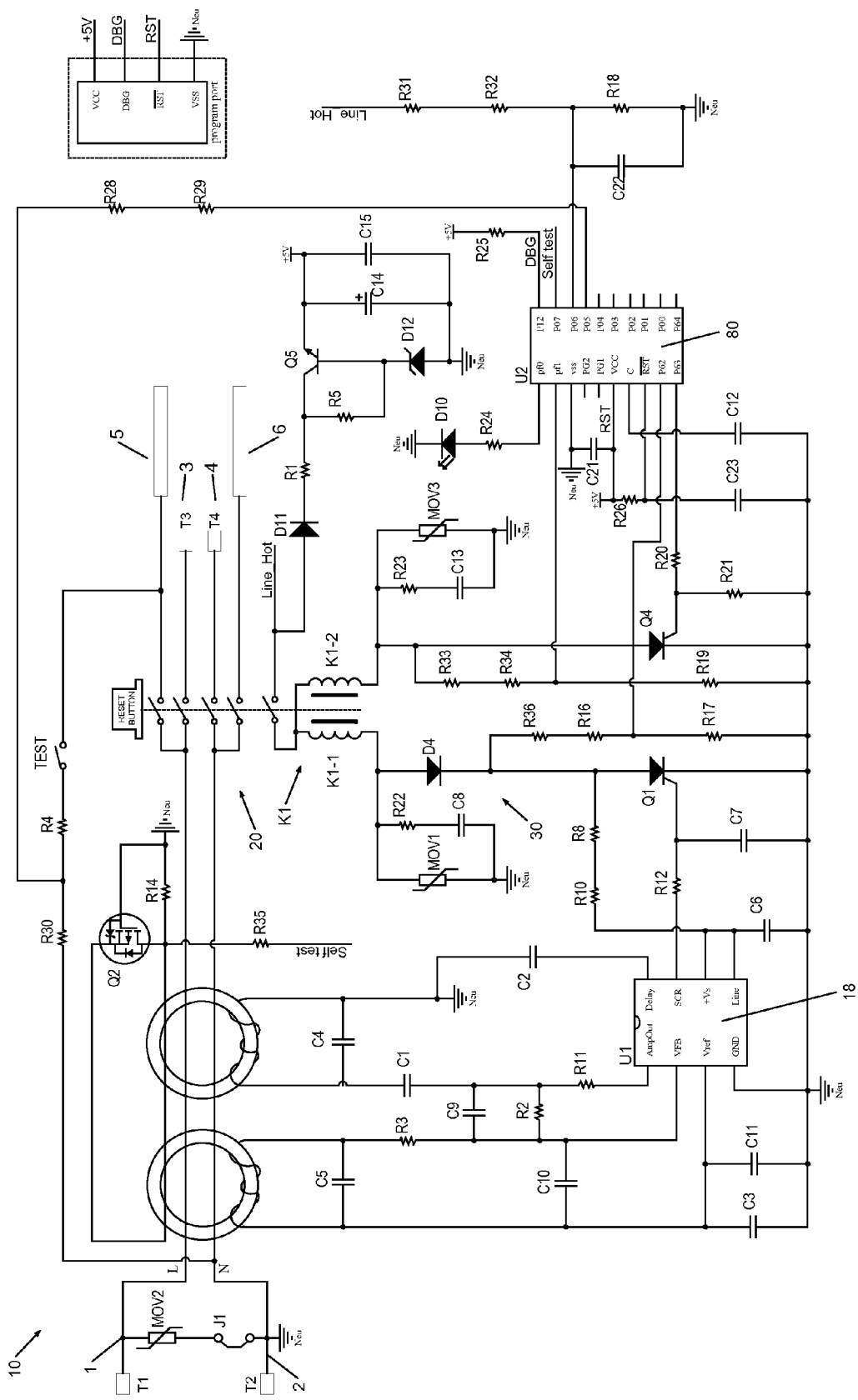
FIG. 3 is a schematic view of a protective device in accordance with another embodiment of the present invention.

As embodied herein, and depicted in FIG. 3, a schematic view of a protective device in accordance with another embodiment of the present invention is disclosed. In this embodiment, the core GFCI functionality is similar to the device depicted in FIGS. 1A-1B.

One difference relates to the GFCI power supply. In this embodiment, a single power supply 30 including diode D4, resistors R8 and R10 and capacitor C6 provide an unfiltered half wave power supply. The GFCI power supply D4 is only on during the positive half cycles. Thus, this embodiment does not perform self-testing during the negative half cycles. Instead, the self-test is performed near the conclusion of the positive half cycle when the instantaneous supply voltage is close to the zero cross, and thus low enough that the circuit interrupter will not trip.

The grounded neutral simulation circuit is driven by a signal from the processor 80. This method provides greater versatility about where on the AC line cycle the grounded neutral test signal is to be performed. This feature allows some simplification of the power supply. This feature also allows the processor to schedule testing with more flexibility; i.e., the self-test does not have to be performed every AC line cycle. This allows the processor 80 to extend the end of life trip decision over a greater period of time. Delaying the trip decision reduces the chances of nuisance tripping due to some momentary load condition, such as an inrush that could defeat the end of life test regime. Note that pin 17 of processor 80 is coupled to the test switch. When the test switch (TEST) is depressed, pin 17 goes HIGH to alert the processor 80 to occurrence of a manual test event. As before, the manual test feature causes the circuit interrupter 20 to trip. Moreover, the wiring state detection features of this embodiment are similar to the embodiment of FIGS. 1A-1B, excluding the POR feature. The actuation of the manual test button causes the processor 80 to perform the above described miswiring detection routine. Since a button is involved, this method is referred to as "manual" multi-use miswire. The button can be a discrete test button or it can be a combination button where the test function is performed when the button is depressed to complete the test circuit and mechanically coupled to the circuit interrupter to such that the When the POR feature is included, no button is involved which is why it is referred to as affording "automatic" multi-use miswire. Either way, processor (40,80) is programmed to change the state of the wiring state register based on whether the GFCI 10 is properly wired or miswired. And either way, the wiring state is determined by whether (or not) the zero crosses are present or absent in the tripped state.

In one embodiment of the invention, the processor 80 is implemented using a Fujitsu MB 95f564k processor. Like the previous embodiment, this processor is a 20 pin device and includes an 8 bit processor having a 1 MHz clock, 20 kB of ROM and 496 B of flash memory.

Figure 4A:
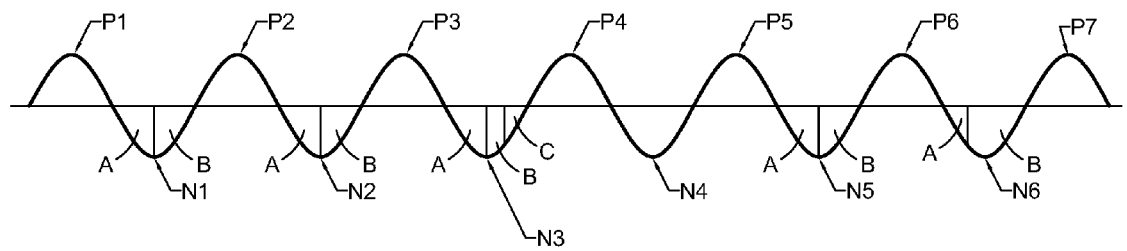
FIGS. 4A-4C are charts showing various timing diagrams in accordance with the present invention.
Figure 4B:
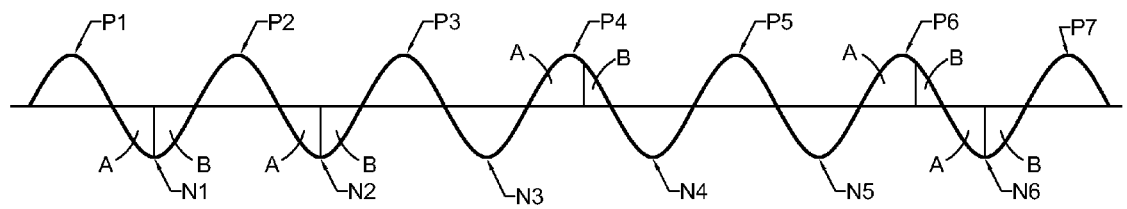
Figure 4C:
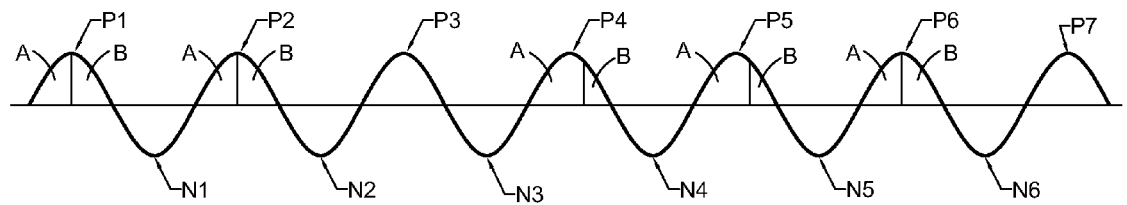

In reference to FIGS. 4A-4C, charts showing various timing diagrams in accordance with the present invention are disclosed. In FIGS. 4A-4C, the positive half cycles are denoted as $P_1$-$P_N$, wherein P refers to the positive half cycle and N is the integer number of positive half cycles. Thus, $P_1$ is the first positive cycle, $P_2$ is the second positive cycle, and etc. The negative half cycles are labeled $N_1$-$N_M$, where N refers to the negative half cycle and M is the integer number of cycles such that $N_1$ is the first negative cycle, $N_2$ is the second negative cycle, and so on and so forth.

FIGS. 4A-4B apply to situations where the GFCI power supply 30 is energized for substantial portions of the entire AC line cycle (i.e., both the positive half-cycle and the negative half-cycle) and FIG. 4C is applicable to embodiments wherein the power supply is not energized during a significant portion of the negative half-cycle.

Briefly, the term "self-test" refers to either the grounded neutral self-test, a ground fault self-test or an AFCI self-test. The AFCI self test may include a grounded neutral-test or a ground fault self-test if a GFCI functionality is included in the AFCI to sense particular arc fault conditions, e.g., arc faults that occur between line and ground. The POR tests are described herein as including one or more of the automatic multi-use miswire test, the ground continuity test, or the reverse polarity tests.

Referring to FIG. 4A, the circuit interrupter 10 is configured to trip during the positive half cycles $P_1$-$P_7$. All of the testing takes place during the negative half cycles. FIG. 4A illustrates some of the mix and match test combination possibilities. As illustrated, testing takes place during half cycles $N_1$-$N_3$, and $N_5$-$N_6$. One reason for not testing during the positive half cycles is to avoid any false tripping. Testing is also not performed during half-cycle $N_4$. The reader should note that the negative half cycles are divided into segments (i.e., A, B and sometimes C). For example, negative half-cycle $N_3$ also includes a "C" segment. Based on these segments, the simulated grounded neutral test is performed during the regions labeled "A" in negative half cycles $N_1$, $N_2$, and $N_5$, and no other testing is performed during the B-portion of these cycles. The processor 40/80 is scheduled by the firmware to perform a self-test in segment A of negative half cycle $N_3$, and a POR test in segment C of this half-cycle. During negative half cycle $N_6$ another POR test is performed in segment A instead of performing a self-test. Accordingly, self-testing is performed in selected negative half cycles. POR testing may be performed when self-testing is not performed or occasionally, both tests can be performed in the same half-cycle. The processor typically schedules a POR tests immediately after supply voltage has just been applied to the device.

The duration of the negative half cycle self-test is minimized to avoid a latent test signal from encroaching into the next positive half cycle and causing a nuisance trip. Accordingly, one embodiment of the present invention, implements segment A as approximately a 4 millisecond (mS) window within which a simulated grounded neutral fault test is performed. In another embodiment, the self-test performs a simulated ground fault that is relatively faster than the grounded neutral test. In another embodiment the noise filter stage 25 of the GFCI (See FIG. 1A) is bypassed to shorten the test time. For example, pin 1 of processor 40 may provide an ERROR signal input to the detector 18 to bypass filter 25 such that SCR Q1 turns ON in about 2 mS. If the detector 18 or the SCR Q1 fails to respond within a predetermined time frame, the processor directs SCR Q3 to trip the device. This feature reduces the chances of nuisance tripping and also reduces the amount of time that the half wave power supply must be sustained during the negative half cycle. In this embodiment, therefore, the number of capacitors in the bank (C15-19) can be reduced.

In FIG. 4B, a similar half-cycle framework is shown in accordance with another embodiment of the present invention. Here, self-testing is performed during the A-segments of negative half cycles $N_1$, $N_2$ and $N_6$, whereas the POR testing is performed during the B-segment portions of positive half cycles $P_4$, $P_6$, and $P_7$. FIG. 4B illustrates some of the mix and match test combination possibilities within the scope of the invention.

In FIG. 4C, both the self-testing and the POR testing are performed by processor 80 during the positive half cycles. Again, the testing takes place late in the positive half cycles where the circuit interrupter cannot trip. For example, the self-testing is performed during positive half cycles $P_1$, $P_2$, and $P_6$ in the B-segment and is timed such that SCR Q1 is turned ON relatively close to the zero-cross such that there is insufficient energy to energize the solenoid K1. The POR testing is performed during positive half cycles $P_4$ and $P_5$. In the embodiment of FIG. 3, for example, the GFCI power supply 30 is energized during substantial portions of the positive half cycles but is not energized during enough of the negative half cycle to permit testing at that time.

Although the foregoing has been described for GFCIs it is applicable to other protective devices such as AFCIs or combination AFCI/GFCIs.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring device for use in an electrical distribution system, the electrical distribution system including a plurality of line conductors coupled to an AC power source and a plurality of load conductors, the device comprising:

a plurality of line terminals and a plurality of load terminals configured to terminate the plurality of line conductors and the plurality of load conductors in a wiring state, the wiring state consisting of a properly wired condition when the plurality of line conductors are terminated to the plurality of line terminals and a miswired condition when the plurality of line conductors are terminated to the plurality of load terminals;

a protective circuit assembly coupled to the plurality of line terminals or the plurality of load terminals, the protective circuit assembly including at least one fault detector configured to generate a fault detection signal based on electrical perturbations propagating on at least one of the plurality of line terminals or at least one of the plurality of load terminals;

a circuit interrupter assembly coupled to the protective circuit assembly, the circuit interrupter assembly including a plurality of interrupting contacts configured to establish continuity between the plurality of line terminals and the plurality of load terminals in a reset state in response to a reset stimulus and establish a discontinuity between the plurality of line terminals and the plurality of load terminals in a tripped state in response to a trip stimulus including the fault detection signal or a miswiring state signal when in the miswired condition; and a processing circuit configured to determine the wiring state based on detecting a wiring state parameter at the plurality of line terminals during a predetermined period after the tripped state has been established, the wiring state parameter corresponding to a signal characteristic of the AC power source, the processing circuit being configured to store a wiring state indicator in a wiring state register based on a wiring state determination, the wiring state register being preset to trip the circuit interrupter when the AC power source is applied by an installer to the plurality of line terminals or the plurality of load terminals for the first time.

2. The device of claim 1, wherein the processing circuit is configured to trip the circuit interrupter after the reset stimulus if the wiring state indicator indicates that the AC power source is coupled to the plurality of load terminals.

3. The device of claim 1, wherein the processing circuit is configured to maintain the reset state after the reset stimulus if the wiring state indicator indicates that the AC power source is coupled to the plurality of line terminals.

4. The device of claim 1, wherein the processing circuit is configured to preset the wiring state indicator to a miswired indication when the device enters the stream of commerce.

5. The device of claim 4, wherein the preset miswired indication is changed to a proper wiring state indication if the processing circuit detects the wiring state parameter during the predetermined period.

6. The device of claim 4, wherein the preset miswired indication is maintained if the processing circuit fails to detect the wiring state parameter during the predetermined period.

7. The device of claim 6, wherein the processing circuit is configured to read the wiring state register in response to detecting a trip stimulus and provide the miswiring state signal to the circuit interrupter if a miswired indication is stored in the wiring state register.

8. The device of claim 1, further comprising at least one user-accessible button element configured to apply the reset stimulus and the trip stimulus to the circuit interrupter.

9. The device of claim 8, wherein the at least one user-accessible button element includes a test button and a reset button, the test button and the reset button being independently operable.

10. The device of claim 8, wherein the at least one user-accessible button element is coupled to a test circuit configured to generate a simulated fault condition.

11. The device of claim 1, wherein the wiring state register is implemented by an electronic memory device.

12. The device of claim 1, wherein the wiring state register is implemented by a capacitor element.

13. The device of claim 1, wherein the wiring state register and the processing circuit are implemented in a single integrated package.

14. The device of claim 11, wherein the integrated package includes an integrated circuit form factor.

15. The device of claim 1, wherein the processing circuit is implemented as an embedded microprocessor or a state machine.

16. The device of claim 1, wherein the processing circuit is implemented by a signal processor, a RISC processor, a CISC processor, at least one application specific integrated circuit (ASIC), at least one field programmable gate array (FPGA) device, at least one customized integrated circuit, or a combination thereof.

17. The device of claim 1, further including a ground terminal configured to terminate a ground conductor in the electrical distribution system, wherein the processing circuit is configured to transmit a predetermined signal on the ground terminal from time to time, the processing circuit being configured to monitor a response of the electrical wiring device to the predetermined signal to detect a device wiring condition selected from a group of device wiring conditions including the miswired condition, the properly wired condition, a reverse polarity condition, or an open ground condition.

18. The device of claim 17, wherein the predetermined signal generates the fault detection signal if the device is improperly wired or the ground conductor is not wired to the ground terminal, the fault detection signal being configured to drive the circuit interrupter into the tripped state.

19. The device of claim 17, wherein the predetermined signal is configured to drive the circuit interrupter into the tripped state if the device is improperly wired or the ground conductor is not wired to the ground terminal.

20. The device of claim 17, wherein the predetermined signal generates the fault detection signal if the device is properly wired and the ground conductor is terminated to the ground terminal, the processing circuit being configured to drive the circuit interrupter into the tripped state from the reset state absent the fault detection signal.

21. The device of claim 17, wherein the predetermined signal is generated at a predetermined time in the AC line cycle so as to generate a fault detection signal occurring late in a positive half cycle of the AC power source or during a negative half cycle of the AC cycle of the AC power source.

22. The device of claim 17, wherein the predetermined signal is generated in response to a correct polarity condition and is not generated in response to a reverse polarity condition.

23. The device of claim 1, wherein the processing circuit is configured to perform a device integrity test of the protective circuit assembly from time to time, the processing circuit being configured to generate a device integrity fault signal when the protective circuit assembly fails the device integrity test.

24. The device of claim 23, further including a test circuit configured to generate a test signal as part of the device integrity test, the test signal being generated from time to time during a predetermined portion of a cycle of the source of AC power, the processor generating the device integrity fault signal if the protective circuit assembly fails to respond to the test signal within a predetermined period of time.

25. The device of claim 23, further including a ground terminal configured to terminate a ground conductor in the electrical distribution system, the processing circuit being configured to propagate a wiring confirmation signal on the ground terminal from time to time as part of the device integrity test.

26. The device of claim 25, wherein the at least one fault detector detects the miswired condition, the properly wired condition, a reverse polarity condition, or an open ground condition in response to the wiring confirmation signal.

27. The device of claim 26, wherein the wiring confirmation signal and the test signal are configured to elicit fault detection signals timed to occur late in a half cycle of the source of AC power or during a negative half cycle of AC power where the fault detection circuit is incapable of tripping the circuit interrupter.

28. The device of claim 27, wherein the fault detection signals timed to occur late in a half cycle of the source of AC power or during a negative half cycle of AC power include a simulated ground fault condition or a simulated grounded neutral condition.

29. The device of claim 25, wherein the wiring confirmation signal and the test signal occur on different half cycles of the source of AC power.

30. The device of claim 25, wherein the wiring confirmation signal and the test signal occur during the same half cycle of the source of AC power.

31. The device of claim 23, wherein the circuit interrupter further includes a first solenoid responsive to the fault detection circuit and a second solenoid responsive to the processing circuit, the first solenoid or the second solenoid being capable of driving the circuit interrupter into the tripped state.

32. The device of claim 1, further including a manually operable test button coupled to a test circuit, the test circuit being configured to trip the circuit interrupter in response to an actuation of the test button, the processing circuit including a test button detector for detecting the actuation of the test button.

33. The device of claim 32, wherein the circuit interrupter further includes a first solenoid responsive to the fault detection signal and a second solenoid responsive to the processing circuit, the first solenoid or the second solenoid being configured to drive the circuit interrupter into the tripped state, the first solenoid and the second solenoid being coupled to a line terminal by way of an auxiliary switch that is in the closed position when the circuit interrupter is in the reset state and in the open position when the circuit interrupter is in the tripped state.

34. The device of claim 32, wherein the processing circuit further includes a zero cross detector for detecting zero crossings in the AC power source, the processing circuit being configured to trip the circuit interrupter if zero crossings are not detected within a predetermined time interval after the actuation of the test button.

35. The device of claim 1, wherein the circuit interrupter further includes an auxiliary switch that is in the closed position when the circuit interrupter is in the reset state and in the open position when the circuit interrupter is in the tripped state.

36. The device of claim 35, wherein the circuit interrupter further includes a first solenoid responsive to the fault detection signal and a second solenoid responsive to the processing circuit, the first solenoid or the second solenoid being configured to drive the circuit interrupter into the tripped state, the first solenoid and the second solenoid being coupled to a line terminal by way of the auxiliary switch.

37. The device of claim 35, wherein the processing circuit further includes a zero cross detector for detecting zero crossings in the AC power source, the processing circuit being configured to trip the circuit interrupter if zero crossings are not detected within a predetermined period of time after the auxiliary switch has entered the open position.

38. The device of claim 1, wherein the wiring state parameter is a zero crossing of the AC power line cycle, an absence of a zero crossing after the circuit interrupter enters the tripped state being indicative of the miswired condition.

39. A method for making an electrical wiring device for use in an electrical distribution system, the electrical distribution system including a plurality of line conductors coupled to an AC power source and a plurality of load conductors, the method comprising:
providing a plurality of line terminals and a plurality of load terminals configured to terminate the plurality of line conductors and the plurality of load conductors in a wiring state, the wiring state being in a properly wired condition when the plurality of line conductors are terminated to the plurality of line terminals, the wiring state being in a miswired condition when the plurality of line conductors are terminated to the plurality of load terminals;
providing a circuit interrupter assembly coupled to the protective circuit assembly, the circuit interrupter assembly including a plurality of interrupting contacts configured to establish continuity between the plurality of line terminals and the plurality of load terminals in response to a reset stimulus and establish a discontinuity between the plurality of line terminals and the plurality of load terminals in response to a trip stimulus;
providing at least one memory register disposed in the protective device;
providing a processor device coupled to the at least one memory register and the plurality of line terminals; and
configuring the processor device to,
monitor the plurality of line terminals during a predetermined period after the tripped state has been established for a presence of a wiring state parameter, the wiring state parameter corresponding to a signal characteristic of the AC power source,
determine the wiring state based on the presence or absence of the wiring state parameter at the plurality of line terminals during the step of monitoring,
store a wiring state indication bit in the at least one memory register based on a wiring state determination,
read the wiring state indication bit in response to the reset stimulus, and
provide the trip stimulus if the wiring state indication bit indicates an absence of the wiring state parameter, or maintain a reset state after a reset stimulus if the wiring state indication bit indicates that the AC power source is in the properly wired condition.

40. The method of claim 39, wherein the processor is further configured to preset the wiring state register to trip the circuit interrupter when the AC power source is applied by an installer to the plurality of line terminals or the plurality of load terminals for the first time.

41. The method of claim 39, further comprising the step of providing a protective circuit assembly coupled to the plurality of line terminals or the plurality of load terminals, the protective circuit assembly including at least one fault detector configured to generate a fault detection signal based on electrical perturbations propagating on at least one of the plurality of line terminals or at least one of the plurality of load terminals.

42. The method of claim 39, wherein the processing circuit is configured to maintain the reset state after the reset stimulus if the wiring state indicator indicates that the AC power source is coupled to the plurality of line terminals.

43. The method of claim 39, wherein the processor is configured to preset the wiring state indicator to a miswired indication when the device enters the stream of commerce.

44. The method of claim 43, wherein the preset miswired indication is changed to a proper wiring state indication if the processing circuit detects the wiring state parameter during the predetermined period, and wherein the preset miswired indication is maintained if the processing circuit fails to detect the wiring state parameter during the predetermined period.

45. The method of claim 39, wherein the at least one memory register and the processor are implemented in a single integrated package.

46. The method of claim 39, wherein the processor is configured to transmit a predetermined signal on a ground terminal from time to time, the processing circuit being configured to monitor a response of the electrical wiring device to the predetermined signal to detect a device wiring condition selected from a group of device wiring conditions including the miswired condition, the properly wired condition, a reverse polarity condition, or an open ground condition.

47. The method of claim 46, wherein the predetermined signal generates the fault detection signal if the device is improperly wired or the ground conductor is not wired to the ground terminal, the fault detection signal being configured to drive the circuit interrupter into the tripped state.

48. The method of claim 46, wherein the predetermined signal is configured to drive the circuit interrupter into the tripped state if the device is improperly wired or the ground conductor is not wired to the ground terminal.

49. The method of claim 46, wherein the predetermined signal generates the fault detection signal if the device is properly wired and the ground conductor is terminated to the ground terminal, the processing circuit being configured to drive the circuit interrupter into the tripped state from the reset state absent the fault detection signal.

50. The method of claim 46, wherein the predetermined signal is generated at a predetermined time in the AC line cycle so as to generate a fault detection signal occurring late in a positive half cycle of the AC power source or during a negative half cycle of the AC cycle of the AC power source.

51. The method of claim 46, wherein the predetermined signal is generated in response to a correct polarity condition and is not generated in response to a reverse polarity condition.

52. The method of claim 39, wherein the processor is configured to perform a device integrity test of the protective circuit assembly from time to time, the processing circuit being configured to generate a device integrity fault signal when the protective circuit assembly fails the device integrity test.

53. The method of claim 39, wherein the wiring state parameter is a zero crossing of the AC power line cycle, an absence of a zero crossing after the circuit interrupter enters the tripped state being indicative of the miswired condition.

\* \* \* \* \*